(12) United States Patent
Dai et al.

(10) Patent No.: US 12,445,538 B2
(45) Date of Patent: Oct. 14, 2025

(54) COMPRESSION TRANSMISSION METHOD FOR REAL-TIME DATA

(71) Applicant: THREE GORGES INTELLIGENT CONTROL TECHNOLOGY CO., LTD, Wuhan (CN)

(72) Inventors: Xi Dai, Wuhan (CN); Chong Xu, Wuhan (CN); Jingfei Liu, Wuhan (CN)

(73) Assignee: THREE GORGES INTELLIGENT CONTROL TECHNOLOGY CO., LTD, Wuhan (CN)

( * ) Notice: Subject to any disclaimer, the term of this patent is extended or adjusted under 35 U.S.C. 154(b) by 207 days.

(21) Appl. No.: 18/490,779

(22) Filed: Oct. 20, 2023

(65) Prior Publication Data

US 2024/0048642 A1  Feb. 8, 2024

Related U.S. Application Data

(63) Continuation of application No. PCT/CN2023/084888, filed on Mar. 29, 2023.

(30) Foreign Application Priority Data

Mar. 30, 2022  (CN) .......................... 202210324923.7

(51) Int. Cl.
*H04L 69/04* (2022.01)
*H04L 69/22* (2022.01)

(52) U.S. Cl.
CPC .............. *H04L 69/04* (2013.01); *H04L 69/22* (2013.01)

(58) Field of Classification Search
CPC .............................. H04L 69/04; H04L 69/22
See application file for complete search history.

(56) References Cited

U.S. PATENT DOCUMENTS

| 2016/0088006 | A1* | 3/2016 | Gupta | H04L 41/16 706/12 |
| 2021/0218498 | A1* | 7/2021 | Effros | H04L 1/16 |
| 2021/0234890 | A1* | 7/2021 | Bansal | H04L 63/0227 |
| 2021/0285672 | A1* | 9/2021 | Samusevich | G06N 3/045 |
| 2021/0344549 | A1* | 11/2021 | Babington | H03M 7/6082 |

* cited by examiner

*Primary Examiner* — Madhu Woolcock

(57) ABSTRACT

A compression transmission method for real-time data is provided, when both a sending terminal and a receiving terminal have accumulated historical data, that is, there is business knowledge. The business knowledge is used by the receiving terminal to construct and train a self-coding network and a fully connection neural network, to thereby construct an output prediction model of an encoder. After the model converges, parameters of the model and a predicted result of an intermediate layer of the self-coding network are sent to the sending terminal by the receiving terminal with a nonreal-time method. After verifying by the sending terminal, the sending terminal decides to send the real-time data or not to send the real-time data to the receiving terminal, and the real-time data is decompressed into simulated real-time data by the receiving terminal according to the predictive result of the intermediate layer of the self-coding network.

7 Claims, 2 Drawing Sheets

COMPRESSION TRANSMISSION METHOD FOR REAL-TIME DATA

TECHNICAL FIELD

The disclosure relates to the field of communications, and more particularly to a compression transmission method for real-time data.

BACKGROUND

In an application scenario of a remote intelligent diagnosis and monitoring application analysis device, data communication has always been a difficult point, which not only ensures real-time visibility of data (i.e., short and high-frequency communication requirements), but also satisfies requirements of high-density and high-precision data collection for advanced application data analysis and fault diagnosis.

Due to an execution of a protocol requiring confirmation of information transmission by a frame header, as business data contained in each frame is shorter, a data transmission efficiency is lower; as the business data contained is longer, delay of business data transmission is greater. In a real-time application scenario, it is necessary to reduce business data volume for each frame transmission in order to reduce delay associated with data, so that the transmission efficiency is low, full bandwidth is occupied by business unrelated data, and basic conditions cannot be satisfied by original requirement for data validation, business interactive, and abnormal recovery.

Data obtained by the remote intelligent diagnosis and monitoring application analysis device includes non-critical strings analog signal waveforms that need to be transmitted in real-time collected by monitoring equipment according to sampling frequency.

SUMMARY

Technical problems of the disclosure are as follows.

Aiming at the problems, the disclosure proposes to combine real-time communication with nonreal-time communication, and perform a lossless compensation method on predictive compression features based on a self-coding network and a fully connected neural network, which not only meets a real-time feedback requirement of monitoring business, but also meets a requirement for business data volume in engineering application scenarios such as business interactive, abnormal recovery, and fault recording.

Technical solutions of the disclosure are as follows.

Technical solutions of the disclosure include a compression transmission method for real-time data, and the method includes: collecting, according to transmission periods, the real-time data under a common synchronous time base and sending the real-time data in real time to a receiving terminal by a sending terminal, dividing each transmission period into a first region for transmitting the real-time data and a second region for transmitting nonreal-time data, and agreeing an interactive period between the sending terminal and the receiving terminal; where the interactive period is divided into at least one training time zone, and transmission periods with a set number are composed into one of the at least one training time zone; and the second region starts when frame tail information of the real-time data appears, or the second region starts when frame header information of the real-time data does not appear at timeout after start of each transmission period.

The nonreal-time data includes verification data and feedback information composed of real-time feedback information and nonreal-time feedback information, the real-time feedback information includes a predictive compression feature of real-time data at a next transmission period predicted by the receiving terminal, and a time stamp of a decompressed predictive compression feature, the nonreal-time feedback information includes decoder parameters generated at a recently completed training time zone and allowable deviations generated within the interactive period, and the decoder parameters are configured to decompress the predictive compression feature; in the recently completed training time zone, encoder parameters for compressing received real-time data into compression features are generated by the receiving terminal, real-time data received in the interactive period is compressed according to the encoder parameters to obtain compressed real-time data, then the compressed real-time data is decompressed according to the decoder parameters to obtain a predictive waveform, a difference between the predictive waveform and the received real-time data received in the interactive period is calculated, the difference is sequentially discretized and entropies are calculated to obtain the verification data, and a statistical process is performed on each value obtained by calculating the entropies to obtain a standard deviation threshold as the allowable deviations.

The decoder parameters are compressed in blocks by the receiving terminal according to interactive information received before reaching the interactive period, or the decoder parameters are compressed in blocks after reaching the interactive period according to received interactive information to obtain compressed decoder parameters, the compressed decoder parameters, the allowable deviations and the verification data are sent to the sending terminal in the second region of the transmission period, current real-time data is processed into the predictive compression feature and the time stamp of the next transmission period by the receiving terminal, and the predictive compression feature and the time stamp of the next transmission period are sent to the sending terminal in the second region before the next transmission period.

The predictive compression feature is decompressed by the sending terminal according to received decoder parameters and is matched with the time stamp, the predictive compression feature is aligned in time and subtracted with real-time data collected at a next moment, a residual and an entropy of the residual are calculated, when the entropy of the residual is not larger than the allowable deviation, the real-time data is not sent by the sending terminal to the receiving terminal, the predictive compression feature is decompressed by the receiving terminal using the decoder parameters as the real-time data at the next moment; when the entropy of the residual is larger than the allowable deviation, the real-time data is sent to the receiving terminal after a next first region starts.

In an embodiment, a rule for sending the feedback information from the receiving terminal to the sending terminal includes: decompressing, according to the received decoder parameters, each predictive compression feature received from last time receiving nonreal-time feedback information to a previous moment by the sending terminal to obtain a decompressed predictive compression feature, calculating a difference between the decompressed predictive compression feature and each original waveform collected from the last time receiving nonreal-time feedback information to a current moment by the sending terminal, sequentially discretizing the difference and calculating an entropy, and comparing the entropy to the verification data;

when the entropy is not smaller than the verification data, sending interactive information to the receiving terminal when waiting for the next interactive period to reach, and sending, by the receiving terminal, formed feedback information of decoder parameters including a self-coding network to the sending terminal; and when the entropy is smaller than the verification data, sending the interactive information to the receiving terminal after completing a next transmission of the real-time data, and sending, by the receiving terminal, formed nonreal-time feedback information of the decoder parameters including the self-coding network to the sending terminal.

In an embodiment, the receiving terminal is configured with the self-coding network and a fully connected neural network, the sending terminal is configured with a decoder of the self-coding network, currently obtained real-time data is input into an encoder by the receiving terminal to obtain an output, and the output is input into the fully connected neural network by the receiving terminal to obtain the predictive compression feature.

In an embodiment, the real-time data within a previous interactive period is processed by the receiving terminal using the self-coding network and the fully connected neural network into a predictive compression feature and a time stramp of a first group of transmission periods of a next interactive period, the predictive compression feature is decompressed as real-time data of a next group of transmission periods, and the processing is repeated to obtain predictive compression features and time stamps of all transmission periods of the next interactive period, then after compressing in blocks, the predictive compression features and the time stamps are sent to the sending terminal according to interactive information received before reaching the interactive period, or the predictive compression features and the time stamps are sent to the sending terminal after reaching the interactive period.

In the technical solution, the predictive compression feature of the real-time data received at each transmission period within the next interactive period is predicted by the receiving terminal according to the encoder and the fully connected neural network before reaching each interactive period, and one-time reaching the interactive period. After decompressing the predictive compression feature by the sending terminal using the decoder, the predictive compression feature is aligned according to the time stamp to obtain a predictive waveform of each transmission period at the next interactive period.

In an embodiment, the self-coding network and the fully connected neural network are obtained by the following steps:

step 1, obtaining, by using all or parts of the real-time data received in a training time zone, multiple training datasets with a no-return sampling by the receiving terminal;

step 2, extracting multiple samples from the training datasets to train the self-coding network to convergence, to thereby obtain a trained self-coding network;

step 3, taking out a sample at a period t from remaining samples of the training datasets, inputting the sample of the period t into the trained self-coding network, using an output $X_t$ of the encoder as an input term of the fully connected neural network, taking out a sample at a period t+1 from the remaining samples of the training datasets, using an output $X_{t+1}$ of the encoder as a real value of an output term of the fully connected neural network, and comparing the real value of the output term of the fully connected neural network to the output term of the fully connected neural network to calculate a loss function, to thereby train the fully connected neural network; and step 4, extracting other samples from the training datasets to repeat the step 2 to step 3 until the fully connected neural network converges.

In an embodiment, a discretization sampling is implemented by an equal-width binning.

In an embodiment, the nonreal-time data further includes non-critical data cached by the sending terminal and not necessarily transmitted in real-time, the non-critical data is compressed by the sending terminal to obtain compressed non-critical data, each communication volume is calculated through a remaining bandwidth of the second region of the transmission period by the sending terminal, the compressed non-critical data is partitioned and sent to the receiving terminal in the second regions of multiple transmission periods.

In an embodiment, the sending terminal includes a first processor and a first memory coupled to the first processor, and the first memory stores at least one instruction; and the receiving terminal includes a second processor and a second memory coupled to the second processor, and the second memory stores at least one instruction.

Beneficial effects of the disclosure are as follows.

The disclosure accumulates business knowledge by the receiving terminal, trains a predictive model of the real-time data, a compression feature of the real-time data is sent to the sending terminal by the receiving terminal in each transmission period, and the compression feature is decompressed by the sending terminal according to the compression feature and the decoder obtained from the receiving terminal to obtain a simulation waveform. When a difference between the simulation waveform and real-time data just collected is small, the real-time data is not sent, and the real-time data is decompressed by the receiving terminal according to the compression feature; otherwise, the real-time data is sent to the receiving terminal by the sending terminal, bandwidth capable of transmitting nonreal-time data at the transmission period is increased by such communication method, a business data volume of the real-time data transmitted each time is reduced, a delay is reduced, and efficiency is improved. It not only meets a real-time feedback requirement of monitoring business, but also meets a requirement for business data volume in engineering application scenarios such as business interactive, abnormal recovery, and fault recording.

BRIEF DESCRIPTION OF DORIGINALINGS

Drawings here are incorporated into the specification and form a part of the specification, showing embodiments in accordance with the disclosure, and are used together with the specification to explain a principle of the disclosure.

feedback information and verification information sent by a data receiving terminal to a data collecting terminal;

a busy line ratio of block-based nonreal-time communication adopted by the data collecting terminal for compensating the data receiving terminal;

a ratio of busy lines to total time in a process of using a lossy compression algorithm for the data receiving terminal by the data collecting terminal to achieve real-time business communication;

a ratio of busy lines to total time in a process of real-time communication directly using a traditional transmission method.

Figure 3:
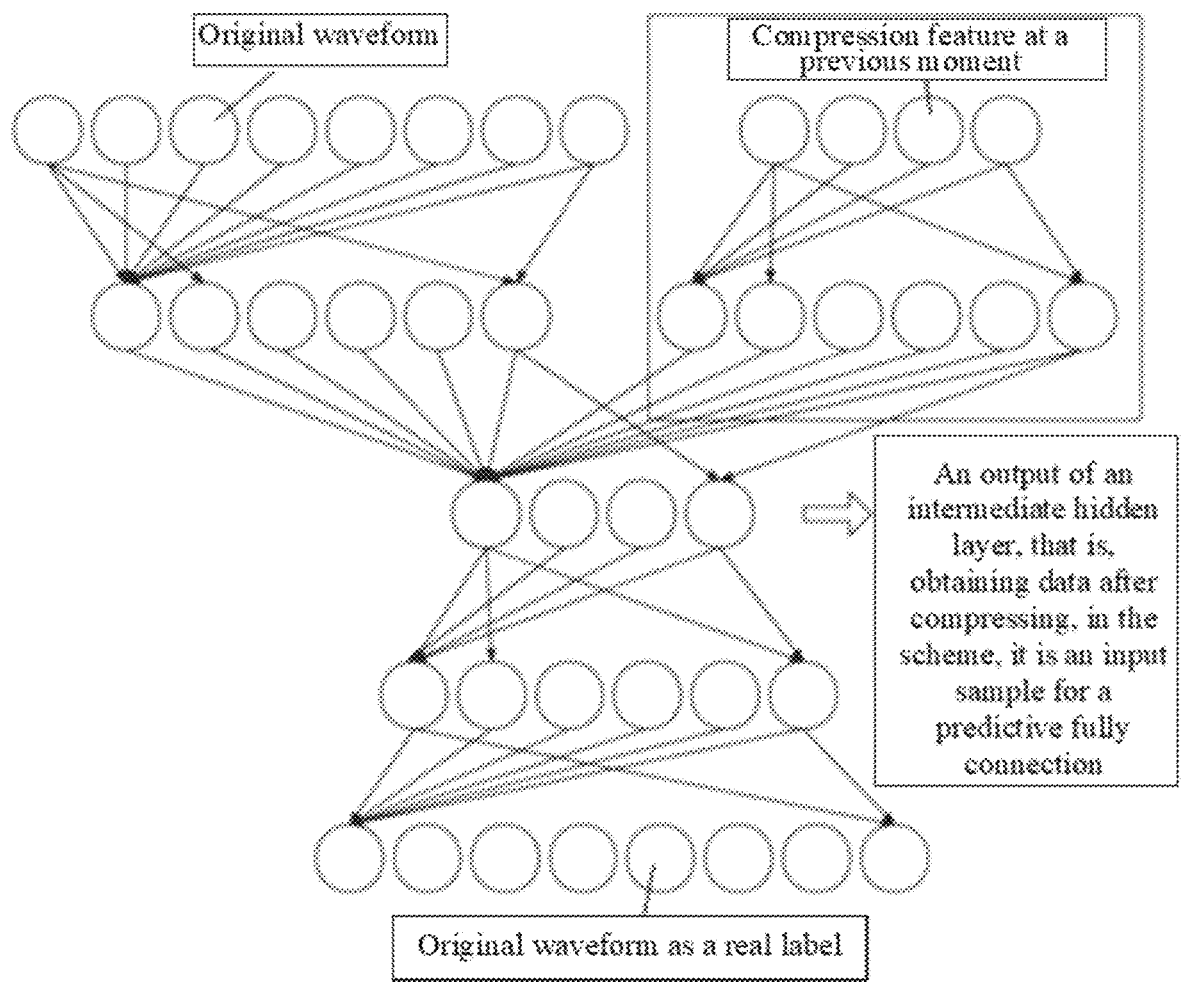

FIG. 3 illustrates a schematic diagram of a training process of a self-coding network and a fully connected neural network according to an embodiment of the disclosure.

DETAILED DESCRIPTION OF EMBODIMENTS

Technical solutions in embodiments of the disclosure will be clearly and completely described in conjunction with drawings in the embodiments of the disclosure below. Obviously, the described embodiments are merely some of the embodiments of the disclosure, not all of them. Based on the embodiments of the disclosure, all other embodiments obtained by those skilled in the art without creative work fall within a scope of protection of the disclosure.

Comparative Embodiment 1

A communication method is provided, and the method is used to send real-time data and nonreal-time data to a receiving terminal. The real-time data is an analog signal collected from a known number of sensors according to a set frequency; and the nonreal-time data includes business applications with low real-time requirements such as data for correcting deviation, self-coding parameters, abnormal alarm information, and fault recording.

The communication method includes the following steps S1-S6.

In step S1, collected nonreal-time data is cached by a sending terminal, and a data connection is constructed between the sending terminal and the receiving terminal to synchronize a clock frequency.

In step 2, a communication protocol is conferred between the sending terminal and the receiving terminal, and the communication protocol includes information such as a time interval (i.e., transmission period) of an information frame sent by the sending terminal, an agreed length of the information frame sent each time, timeout duration for confirming a sending status of the information frame, and a sending period of interactive information, that is a length of a real-time communication window.

The time interval of the information frame is usually in a range of 20-50 milliseconds (ms), timeout is caused when sending null characters for 2 ms consecutively in a real-time protocol, and timeout is caused when sending null characters for 4 ms consecutively in a hypertext transfer protocol (http), and the timeout means that no information frame is sent in this round.

In the real-time communication window, original real-time data instantly reflecting current state is sent by the sending terminal; the nonreal-time data with a low requirement of timeliness is sent by the sending terminal after sending the original real-time data, or when no data is sent from the real-time communication window. A synchronous transmission method is adopted for the original real-time data, the information frame is used as a transmission unit for the synchronous transmission method, a head and a tail of each information frame are needed to add special characters or bit sequences, information in the head is frame header information, information in the tail is frame tail information, and the frame header information and the frame tail information mark start and end of an information frame. The synchronous transmission means that a time interval between the special characters or the bit sequences of heads of adjacent information frames is fixed, and a time relationship between the special characters or the bit sequences of heads of adjacent information frames must be strictly required. An asynchronous transmission method is adopted for the nonreal-time data, and the asynchronous transmission means that a time interval between sent characters can be arbitrary when sending characters. Obviously, the receiving terminal must always be ready for receiving. The sending terminal can start sending the characters at any time, so that marks must be added at the start and end of each character, that is, adding a start site and a stop site, so that the receiving terminal can correctly receive each character.

In step S3, a sending method of the original real-time data in a scenario without business knowledge includes the following steps. When a communication is initially constructed, there is no data accumulation at the sending terminal and the receiving terminal, that is, there is no business knowledge. Collected original real-time data is updated to a compression information frame by the sending terminal using a slope compression algorithm according to a change value, a lossy communication is achieved between the sending terminal and the receiving terminal by conferring an allowable deviation, received compression information frame is decompressed and conversed by the receiving terminal according to the slope compression algorithm to obtain a decompressed and conserved compression information frame, and the decompressed and conserved compression information frame is updated to a dataset for showing a true waveform.

A specific algorithm of the slop compression algorithm is as follows:

defining X(n) as a value of a collection terminal at a N-th moment, Y(n) as data sent from the sending terminal at the N-th moment, and Z(n) as data transformed by the receiving terminal at the N-th moment:

$$slope = X(n-1) - X(n-2)$$

$$Tmp(n) = Z(n-1) + slope$$

$$IF |Tmp(n) - X(n)| <= deviation$$

$$Z(n) = Tmp(n)$$

Else:

$$Z(n) = Y(n) = X(n).$$

An allowable deviation of the comparative embodiment 1 is 0.1, and Table 1 is as follows.

TABLE 1

| Point of time | 1 | 2 | 3 | 4 | 5 | 6 | 7 | 8 | 9 | 10 | 11 | 12 |
|---|---|---|---|---|---|---|---|---|---|---|---|---|
| Original real-time data of the collection terminal [X] | 1 | 2 | 3 | 5 | 4 | 1 | 2 | 2.9 | 4.2 | 3 | 2 | 1 |

TABLE 1-continued

| Point of time | 1 | 2 | 3 | 4 | 5 | 6 | 7 | 8 | 9 | 10 | 11 | 12 |
|---|---|---|---|---|---|---|---|---|---|---|---|---|
| Compression information frame sent in real-time by the sending terminal [Y] | 1 | 2 | — | 5 | 4 | 1 | 2 | — | 4.2 | 3 | 2 | — |
| True wave obtained in real-time by the receiving terminal [Z] | 1 | 2 | 3 | 5 | 4 | 1 | 2 | 3 | 4.2 | 3 | 2 | 1 |

At the moments 1 and 2, a data corresponding relationship of the receiving terminal, the sending terminal and the collection terminal is [Z(1)=Y(1)=X(1); Z(2)=Y(2)=X(2)] according the slop compression algorithm, and collected original real-time data is sent by the sending terminal.

At the moment 3, Tmp(3)=Z(2)+X(2)−X(1)=3; since |Tmp(3)−X(3)|=0, which is smaller than the allowable deviation 0.1, and Z(3)=Tmp(3)=3. An algorithm result does not contain Y, that is, the sending terminal does not need to send data. A same algorithm is run by the receiving terminal, and Z(3)=3 is obtained, which is equal to data of the collecting terminal; at this time, the sending terminal does not need to send data, and the receiving terminal can obtain a same result as the original real-time data of the collecting terminal.

At the moment 4, slope=X(3)−X(2)=1; Tmp(4)=Z(3)+slope=3+1=4; |Tmp(4)−X(4)|=1>deviation (0.1); and Z(4)=Y(4)=X(4) is obtained. At this time, the original real-time data and a calculation result of the receiving terminal are beyond an allowable deviation range, and the sending terminal needs to send the original real-time data to the receiving terminal.

At the moment 8, slope=X(7)−X(6)=1; Tmp(8)=Z(7)+slope=2+1=3; |Tmp(8)−X(8)|=0.1<=deviation; and Z(8)=Tmp(8)=3 is obtained. At this time, the original real-time data and the calculation result of the receiving terminal are within the allowable deviation range, the sending terminal does not need to send the original real-time data.

In step 4, a sending method for the non-real-time data is provided. The nonreal-time data with low timeliness requirements is sent by the sending terminal after sending the compression information frame (i.e., when the frame tail information is sent), or when there is no data sent after exceeding the timeout duration after an end of a time interval. Since the compression information frame needs to guarantee business with a high timeliness requirement, the compression information frame has a high priority, and the nonreal-time data cannot occupy the time window of the compression information frame. Therefore, the nonreal-time data is compressed in blocks to nonreal-time data blocks with a fixed size by the sending terminal, then a communication volume is calculated according to the time interval and a remaining time interval of the information frame, the nonreal-time data blocks are assembled into a data block set, a size of the data block set is not larger than the communication volume, identifiers are added on a starting end and an ending end of the data block set, and the data block set is sent to the receiving terminal, and the data block set is verified, decompressed and loaded into the database for writing data to disk by the receiving terminal after receiving the data block set.

The remaining time interval of the information frame is a residual value after subtracting the compressed information frame duration after lossy compression and subtracting the timeout duration from the agreed information frame duration.

Figure 1:
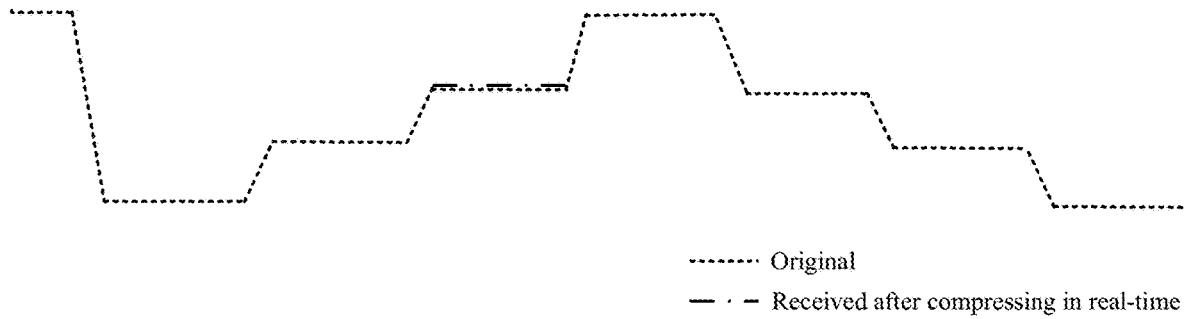
FIG. 1 illustrates a comparison diagram between an original waveform of a sending terminal provided in a comparison embodiment and a waveform recovered by a real-time compression algorithm at the receiving terminal according to an embodiment of the disclosure.
Figure 2:
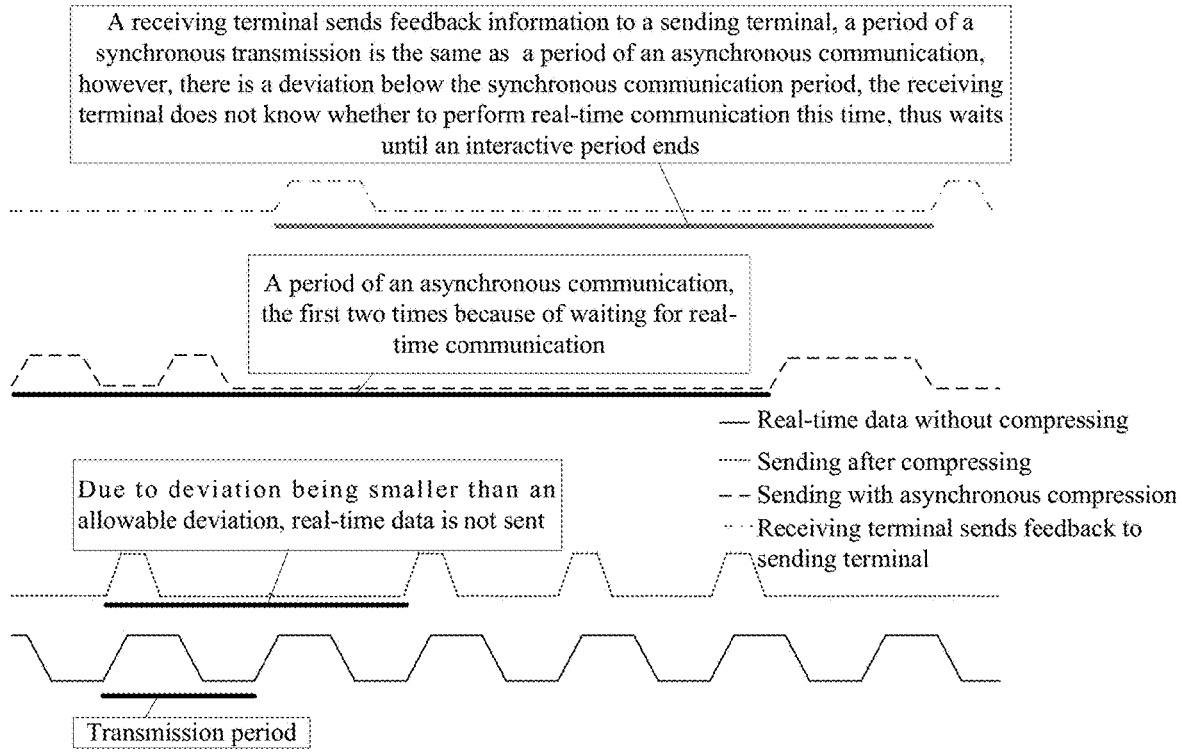
FIG. 2 illustrates a schematic diagram of busy lines in a process of business communication between the sending terminal and a receiving terminal according to an embodiment of the disclosure, and four line ratios from top to bottom are.

The nonreal-time data (i.e., a second dashed line from top to bottom in FIG. 2) can only be sent after sending the compression information frame (i.e., a third dashed line from top to bottom in FIG. 2), or when there is no data to send in the real-time communication window.

A content of the nonreal-time data (i.e., a first dashed line from top to bottom in FIG. 2) sent by the receiving terminal to the sending terminal is heartbeat data. It is different from the nonreal-time data sent by the sending terminal, the receiving terminal cannot know whether a certain real-time communication window needs to send data, therefore, the receiving terminal can only send nonreal-time data after sending data of the real-time communication window (i.e., when the frame tail information is sent), or when there is a timeout after the end of a time interval and no data is sent.

In the step S4, the nonreal-time data is compressed in blocks by using a deflate compression algorithm without loss to obtain compressed nonreal-time data, and the compressed nonreal-time data is sent to the receiving terminal.

The deflate compression algorithm is a default algorithm of a zip compression document, and the deflate compression algorithm is used in a zip document, a 7-zip document, a xz document and other compression documents.

Block compression of the nonreal-time data includes the following steps.

A compression configuration (e.g., sizes of the nonreal-time data blocks, sizes of subblocks, and a number of the subblocks in the nonreal-time data blocks) is set by the sending terminal after receiving multiple document blocks sent by an upper application software, multiple nonreal-time data blocks are generated by compressing, the multiple nonreal-time data blocks are assembled into a data block set according to the communication volume, and lengths of character frames of the nonreal-time data blocks assembled together are ensured to be no larger than the communication volume.

The nonreal-time data blocks include multiple subblocks, and the multiple subblocks include a scheduled size (e.g., 1 kilobyte abbreviated as kb), and block headers corresponding to the multiple subblocks.

A checksum of the nonreal-time data blocks in an uncompressed state within the data block set is generated, such as a cyclic redundancy check (CRC) of the nonreal-time data blocks in the uncompressed state within the data block set.

Decompression and verification of the data block set include the following steps.

Index information corresponding to the multiple subblocks is generated, such as: an index array is generated, and a bit skew of a first token or a symbol of each subblock and a start bit skew of a deflate block header are recorded by the index array.

A checksum of the nonreal-time data blocks associated with the multiple subblocks is generated, such as: a CRC in each subblock is recorded by the index array. The CRC in each subblock is a CRC of all data until end of a specific subblock (includes all previous subblocks).

Whether the checksum of the nonreal-time data blocks in the uncompressed state within the data block set matches a checksum of the nonreal-time data blocks within the data block set after compressing is determined, when the CRCs are the same, it is assumed that the nonreal-time data blocks are compressed without any errors or defeats. The obtained nonreal-time data is merged and decompressed to obtain an original document, and the original document is loaded into the database for writing data to disk.

When the CRCs are different, it is assumed that the nonreal-time data blocks are compressed with errors or defeats.

In step S5, the interactive information is sent to the receiving terminal by the sending terminal after reaching a sending period of the interactive information.

In step S6, after the real-time communication window is over, when the real-time data and the nonreal-time data sent from the sending terminal are not received, or when the receiving terminal receives the interactive information, interactive feedback is sent to the sending terminal by the receiving terminal.

Embodiment 1

Since a main significance of data in a real-time communication stage is monitoring, for ultimately persistent lossy business data information, which is used to construct future business knowledge and reanalyze production data, and it is difficult to satisfy business requirements in terms of accuracy and granularity. Aiming at this problem, an asynchronous compression technology is adopted by the embodiment to compress and restore real-time data with the business knowledge, and the asynchronous compression technology includes the following steps R1-R4.

In step R1, collected nonreal-time data is cached by the sending terminal, and a data connection is established between the sending terminal and the receiving terminal to synchronize a clock frequency.

In step R2, a communication protocol is conferred between the sending terminal and the receiving terminal, and the communication protocol includes a transmission period of the original real-time data (hereinafter referred to as original waveform) sent by the sending terminal, an agreed length of the original waveform for each transmission (i.e., a first region), a timeout duration for determining a sending state of the original waveform, and an interactive period of sending interactive information. The interactive period is divided into at least one training time zone, and the transmission periods with a set number is formed into a training time zone. The training time zone generally includes 5-10 transmission periods, and the interactive period generally includes 5-100 transmission periods.

A duration of the transmission period is generally in a range of 20-50 ms, timeout is caused when sending null characters for 2 ms consecutively in the real-time protocol, and the timeout is caused when sending null characters for 4 ms consecutively in the http protocol, and the timeout means that no original waveform is sent in this round.

The original waveform instantly reflecting the current situation is sent by the sending terminal during the transmission period.

In step R3, the interactive information is sent by the sending terminal to the receiving terminal when a sending period of the interactive information reaches.

In step R4, when real-time data sent by the sending terminal is not received after the interactive period is over, or when the receiving terminal receives the interactive information, verification data with low timeliness requirements, real-time feedback information and nonreal-time feedback information are sent by the receiving terminal to the sending terminal. The real-time feedback information and the nonreal-time feedback information constitute feedback information.

The real-time feedback information includes an intermediate hidden layer of the self-coding network predicted based on the fully connected neural network, and a decompressed time stamp, and the nonreal-time feedback information includes decoder parameters of the self-coding network and an allowable deviation.

In a training time zone with a configurable time length, a method for generating the real-time feedback information, the nonreal-time feedback information and the verification data by the receiving terminal and sending them to the sending terminal is provided, and the method includes the following steps 1-7.

In step 1, the original waveform is sent by the sending terminal to the receiving terminal, and received original waveforms in the training time zone are sequentially copied into a business knowledge dataset by the receiving terminal.

In step 2, three windows, 128, 256, and 512 are used for sliding window interception of the business knowledge dataset, and a no-return sampling is used to construct n groups of training datasets.

In step 3, 5 groups of samples are preferentially extracted from the training datasets to train the self-coding network to convergence, to thereby obtain a trained self-coding network.

In step 4, a sample of a period t is taken from remaining samples of the training datasets, the sample of the period t is input into the trained self-coding network, and an output (i.e., an output of the intermediate hidden layer) Xt of an encoder is used as an input term of the fully connection neural network (i.e., deep neural networks, DNN). A sample of a period t+1 is taken from the remaining samples of the training datasets, the sample of the t+1 period is input into the trained self-coding network, an output Xt+1 of the encoder is used as a true value of an output term of the fully connection neural network, and the output Xt+1 of the encoder is compared to the output term of the fully connection neural network to obtain a loss function, to thereby train the fully connection neural network.

In step 5, new samples are extracted from the training datasets to repeat the step 3 and the step 4 until the fully connection neural network converges, and an output predictive model and a self-coding network of the encoder are constructed. When the decoder parameters of the self-coding network are compressed in blocks by the receiving terminal, the decoder parameters are sent to the sending terminal after sending the original waveform by the receiving terminal.

In step 6, each received original waveform in the interactive period is input into the self-coding network of the step 5 by the receiving terminal to obtain a simulated waveform after compression and decompression, the simulated waveform is subtracted from the original waveform to obtain a simulated residual waveform, a front boundary and a back boundary of the simulated residual waveform are used to make 100 equal-width binning, an entropy value of each simulated residual waveform is calculated as the verification data, and three sigmas of all entropy values are counted as the allowable deviation.

In step 7, when the receiving terminal discovers that current original waveform is received, and the current original waveform is input into the encoder of the self-coding network of the step 5 to obtain an output, the output is input into the fully connection neural network to obtain the output term (i.e., predicted output of the encoder at a next moment), and the output term, corresponding time stamp and the allowable deviation are sent to the sending terminal.

A method for the sending terminal to communicate with the receiving terminal according to the feedback information is provided, and the method includes the steps 8-9.

In step 8, the predicted output of the encoder at the next moment is decompressed by the sending terminal according to received decoder parameters to obtain a predicted waveform at the next moment, after matching the predicted waveform at the next moment with the received time stamp, the predicted waveform at the next moment is aligned in time with an original waveform at the next moment and subtracted, to obtain a predicted residual waveform, and the entropy value is calculated.

In step 9, when the entropy value obtained in step 8 is not larger than the allowable deviation, it means that the prediction is accurate and there is no missing trend, the sending terminal does not send the original waveform to the receiving terminal, when the receiving terminal does not receive the original waveform beyond the timeout duration after the current transmission period ends, the predicted output of the encoder at the next moment is decompressed by the decoder as the original waveform for real-time display.

When the entropy value obtained in step 8 is larger than the allowable deviation, the original waveform is sent to the receiving terminal after the current transmission period ends.

A method for the sending terminal to verify data according to the verification data is provided, and the method includes the following step 10.

In step 10, each output term received from last-time receiving the nonreal-time feedback information to a last moment is decompressed by the sending terminal according to the received decoder parameters to obtain a decompressed output term, and a difference between the decompressed output term and each original waveform collected from the last-time receiving the nonreal-time feedback information by the sending terminal to current is calculated, and a true residual waveform is obtained. A front boundary and a rear boundary of the true residual waveform are used to make 100 equal-width binning, and an entropy value of each true residual waveform is calculated. When the entropy value is equal to the verification data, it means that a process of receiving the original waveform by the receiving terminal is normal; when the entropy value is larger than the verification data, it means that there is a slight packet loss. For the above two situations, the interactive information is sent to the receiving terminal by the sending terminal when the next interactive period reaches, after sending reformed feedback information containing the decoder parameters of the self-coding network to the sending terminal by the receiving terminal, previous used decoder parameters are updated by the sending terminal to complete calibration. When the feedback information is large, the feedback information needs to be compressed in blocks before being sent.

When the entropy value is smaller than the verification data, it means that there is a serious communication error, and it is necessary to immediately send the feedback information containing the decoder parameters of the self-coding network to the sending terminal by the receiving terminal after completing a next transmission of the original waveform, that is, entering the next interactive period in advance, so that the sending terminal can update the used decoder parameters for calibration.

A communication mode of the embodiment belongs to a real-time data transmission mode in a scene with the business knowledge, when both the sending terminal and receiving terminal have accumulated historical data, that is, there is business knowledge. The business knowledge is used by the receiving terminal to construct and train the self-coding network and the fully connection neural network, to thereby construct the output prediction model of the encoder. After the model converges, parameters of the model and a predicted result of the intermediate layer of the self-coding network are sent to the sending terminal by the receiving terminal with a nonreal-time method. After verifying by the sending terminal, the sending terminal decides to send the real-time data or not to send the real-time data to the receiving terminal, and the real-time data is decompressed into simulated real-time data by the receiving terminal according to the predictive result of the intermediate layer of the self-coding network.

The self-coding network is a neural network model with input equal to output. The historical data is used by the embodiment to train an auto-encoder, then a decoder of the auto-encoder is removed, and an output of a remaining encoder can be used to represent a compression feature of the real-time data. A number of neurons in a hidden layer is much lower than that in an input layer, which is equivalent to using fewer features (i.e., neurons) to represent input data, thus achieving a function of dimensionality reduction and compression.

The fully connection neural network is a simplest neural network, a fully connection neural network structure only includes an input layer and an output layer, and between the input layer and the output layer are hidden layers. Each layer of the neural network includes multiple neurons, the neurons between layers are connected with each other, the neurons in the layers are not connected with each other, and each neuron in a next layer is connected to all neurons in an upper layer, which is a basic form of all neural networks, and is an effective supervise learning method. After obtaining a true value of the output layer, a difference between a calculation output and the true value is compared by the neural network to obtain the loss function, to thereby train the fully connection neural network, so that the output value is infinitely close to the obtained true value after inputting the compression feature of the real-time data.

The binning used in the embodiment is to group data according to a specific rule, and the binning can achieve a discretization of data, enhance a stability of data, and reduce a risk of over-fitting. It is necessary to perform a binning in logistic regression, and other tree models may not be binned. Data binning as one part of data preprocessing is also known as discrete bin or data segmentation. In fact, a concept of the binning is actually very easy to understand, and its essence is to group data.

The entropy value is used to reflect a severity of data differences, data after decompressing the compression feature of the real-time data by the self-coding network is biased, which belongs to noise of the real-time data (i.e., business knowledge) input in a business process, when the business knowledge is completely extracted, a nonbusiness residual is white noise, which is almost constant in energy relative to the business knowledge. Therefore, an entropy of each residual is calculated, a statistical value of the entropy in a training time zone is calculated, and a deviation range is obtained by taking three sigmas. In order to obtain the deviation range dynamically, the simulated residual waveform in a latest training time zone is always taken to calculate and get the statistical value.

The collected nonreal-time data is cached in the embodiment, and the nonreal-time data with low timeliness requirements is sent to the receiving terminal by the sending terminal after sending the original real-time data, or when there is no data transmission in the transmission period.

In an embodiment, the nonreal-time data can be compressed in blocks by the deflate compression algorithm without loss and sent to the receiving terminal, and the nonreal-time data is verified, decompressed and loaded in the database for writing data to disk by the receiving terminal after receiving it.

In an embodiment, the real-time feedback information does not need to be sent in real-time in the step 4, and the step 7 further includes the following steps. The real-time data within the previous interactive period is processed to obtain the predictive compression feature and the time stamp of a first group of the transmission periods of the next interactive period by the receiving terminal using the self-coding network and the fully connection neural network, the predictive compression feature is decompressed as the real-time data of a next group of the transmission periods, and the above processes are repeated to obtain the predictive compression features and the time stamps of all transmission periods of the next interactive period, and the predictive compression features and the time stamps after compressing in blocks are sent to the sending terminal according to the interactive information received before reaching the interactive period, or after reaching the interactive period. The step 8 further includes the following steps. The predictive compression features of all transmission periods in the next interactive period are decompressed by the sending terminal using the decoder to obtain decompressed predictive compression features, each decompression predictive compression feature is aligned according to the time stamp to obtain a predictive waveform of each transmission period in the next interactive period. The original waveforms at the next moment are sequentially aligned in time and subtracted with the predictive waveforms corresponding to the time stamps to obtain the predictive residual waveforms, and the entropy is calculated.

What is claimed is:

1. A compression transmission method for real-time data, comprising:
   collecting by a sending terminal, the real-time data;
   agreeing, between the sending terminal and a receiving terminal, a transmission period and an interactive period; wherein
      the interactive period is divided into at least one training time zone comprising, and transmission periods with a set number; and
      the transmission period is divided into a first period for transmitting the real-time and a second period for transmitting nonreal-time data, and wherein the second period starts when one of a frame tail information of the real-time data appears or when a frame header information of the real-time data does not appear at timeout after a start of each transmission period;
   sending, by the sending terminal, the real-time data in real time to the receiving terminal according to the transmission period;
   the receiving terminal performing:
   generating, in a recently completed training time zone, encoder parameters for compressing the real-time data received from the sending terminal into compression features, wherein the real-time data is received in the interactive period and compressed according to the encoder parameters to obtain compressed real-time data;
   decompressing the compressed real-time data according to decoding parameters to obtain a predictive waveform;
   calculating a difference between the obtaining predictive waveform and the real-time data;
   calculating entropies by sequentially discretizing the calculated difference and performing a statistical process on each value obtained by calculating the entropies to obtain a standard deviation threshold as an allowable deviation;
   compressing, according to received interactive information, decoder parameters into blocks either before reaching the interactive period or after reaching the interactive period according to the received interactive information;
   processing the real-time data into a predictive compression feature and a time stamp of a next transmission period; and
   sending, in the second period of the transmission period before a next transmission period, the nonreal-time data to the sending terminal, wherein the nonreal-time data comprises verification data and feedback information, the feedback information comprises real-time feedback information and nonreal-time feedback information, wherein
   the real-time feedback information comprises the predictive compression feature of real-time data at the next transmission period to be decompressed and aligned with the time stamp by the sending terminal, and
   the nonreal-time feedback information comprises the decoder parameters generated at the recently completed training time zone for decompressing the predictive compression feature and comprises the allowable deviation generated within the interactive period;
   the sending terminal performing:
   decompressing, according to the decoder parameters received from the receiving terminal, the predictive compression feature and matching the decompressed predictive compression feature with the time stamp, wherein the predictive compression feature is aligned in time and subtracted with current real-time data collected at a next moment;
   calculating a residual and an entropy of the residual; and
   determining if the entropy of the residual is larger than the allowable deviation, and
      when the entropy of the residual is not larger than the allowable deviation, the sending terminal does not send the current real-time data to the receiving terminal and the predictive compression feature is decompressed by the receiving terminal using the decoder parameters as real-time data at the moment; and
      when the entropy of the residual is larger than the allowable deviation, the current real-time data is sent to the receiving terminal after a next first region starts.

2. The compression transmission method for real-time data as claimed in claim 1, wherein a rule for sending the feedback information from the receiving terminal to the sending terminal comprises:
   the sending terminal performing:
   decompressing, according to the decoder parameters, the predictive compression feature received from last time receiving nonreal-time feedback information to a previous moment;
   calculating another difference between the decompressed predictive compression feature and each original waveform collected from the last time receiving nonreal-time feedback information to a current moment; and calculating the entropy by sequentially discretizing the calculated difference, and comparing the entropy to the verification data to determine if the entropy is smaller than the verification data;

when the entropy is not smaller than the verification data, sending the interactive information to the receiving terminal when waiting for a next interactive period to reach, and sending, by the receiving terminal, formed feedback information of decoder parameters comprising a self-coding network to the sending terminal; and when the entropy is smaller than the verification data, sending the interactive information to the receiving terminal after completing a next transmission of the real-time data, and sending, by the receiving terminal, formed nonreal-time feedback information of the decoder parameters comprising the self-coding network to the sending terminal.

3. The compression transmission method for real-time data as claimed in claim 2, wherein the receiving terminal is configured with the self-coding network and a fully connected neural network, the sending terminal is configured with a decoder of the self-coding network, and the receiving terminal performs:

inputting currently obtained real-time data is input into an encoder to obtain an output, and inputting the output into the fully connected neural network to obtain the predictive compression feature.

4. The compression transmission method for real-time data as claimed in claim 3, wherein the receiving terminal performs:

processing, using the self-coding network and the fully connected neutral network, the real-time data within a previous interactive period to another predictive compression feature and another time stramp of a first group of transmission periods of a next interactive period, and decompressing the other predictive compression feature as real-time data of a next group of transmission periods;

repeating the processing and the decompressing to obtain predictive compression features and time stamps of all transmission periods of the next interactive period;

compressing the predictive compression features and time stamps of all transmission periods of the next interactive period into blocks either before reaching the interactive period of after reaching the interactive period according to the received interactive information; and sending the predictive compression features and the time stamps of all transmission periods of the next interactive period to the sending terminal.

5. The compression transmission method for real-time data as claimed in claim 4, wherein the self-coding network and the fully connected neural network are obtained by the following steps:

obtaining, by using all or parts of the real-time data received in the training time zone, a plurality of training datasets with a no-return sampling by the receiving terminal;

extracting a plurality of samples from the plurality of training datasets to train the self-coding network to convergence, to thereby obtain a trained self-coding network;

taking out a sample at a period t from remaining samples of the plurality of training datasets, inputting the sample at the period t into the trained self-coding network, using an output Xt of the encoder as an input term of the fully connected neural network, taking out a sample at a period t+1 from the remaining samples of the plurality of training datasets, using an output $X_{t+1}$ of the encoder as a real value of an output term of the fully connected neural network, and comparing the real value of the output term of the fully connected neural network to an output term of the fully connected neural network to calculate a loss function, to thereby train the fully connected neural network; and extracting other samples from the plurality of training datasets to repeat the extracting step and the taking out step until the fully connected neural network converges.

6. The compression transmission method for real-time data as claimed in claim 5, wherein a discretization sampling is implemented by an equal-width binning.

7. The compression transmission method for real-time data as claimed in claim 5, wherein the nonreal-time data further comprises non-critical data cached by the sending terminal and not transmitted in real-time, and the sending terminal performs:

compressing the non-critical data to obtain compressed non-critical data;

calculating each communication volume through a remaining bandwidth of the second period of the transmission period; and sending, in the second period of the transmission periods, the compressed non-critical data to the receiving terminal.

* * * * *